US008155976B1

(12) United States Patent
Rendich et al.

(10) Patent No.: US 8,155,976 B1
(45) Date of Patent: Apr. 10, 2012

(54) AUTOMATED MAILER ENVELOPE ADDRESSING

(75) Inventors: Andrew Rendich, San Ramon, CA (US); Thomas R. Dillon, El Dorado Hills, CA (US); Jon Johnson, Danville, CA (US); Gregory Kinney, Livermore, CA (US)

(73) Assignee: Netflix, Inc., Los Gatos, CA (US)

( * ) Notice: Subject to any disclaimer, the term of this patent is extended or adjusted under 35 U.S.C. 154(b) by 731 days.

(21) Appl. No.: 11/338,625

(22) Filed: Jan. 23, 2006

(51) Int. Cl.
*G06Q 10/00* (2012.01)
*A01K 5/02* (2006.01)
*G06Q 30/00* (2012.01)
*B42D 15/00* (2006.01)

(52) U.S. Cl. ............. 705/1.1; 705/332; 705/28; 705/29; 283/55

(58) Field of Classification Search ................ 705/1, 1.1, 705/28, 29, 332; 283/55
See application file for complete search history.

(56) References Cited

U.S. PATENT DOCUMENTS

| | | |
|---|---|---|
| 3,419,286 A | 12/1968 | Noonan |
| 4,397,542 A | 8/1983 | Broadesser |
| 4,706,877 A | 11/1987 | Jenkins |
| 4,878,613 A | 11/1989 | Badger et al. |
| 5,307,989 A | 5/1994 | Dyer |
| 5,317,654 A | 5/1994 | Perry et al. |
| 5,328,092 A | 7/1994 | File |
| 5,370,302 A | 12/1994 | Dyer |
| 5,634,587 A | 6/1997 | Popat et al. |
| 6,450,399 B1 | 9/2002 | Attia et al. |
| 6,612,484 B2 | 9/2003 | Rawlings et al. |
| 6,966,484 B2 * | 11/2005 | Calonje et al. ................ 229/305 |
| 2003/0236680 A1 * | 12/2003 | Holoubek .......................... 705/1 |
| 2005/0184140 A1 * | 8/2005 | DeLa Vergne ................ 229/301 |
| 2007/0083379 A1 * | 4/2007 | Rosenkranz et al. ............. 705/1 |

FOREIGN PATENT DOCUMENTS

| | | | |
|---|---|---|---|
| GB | 2101528 A | | 1/1983 |
| GB | 2101528 A | * | 1/1983 |
| GB | 2117319 A | | 10/1983 |

(Continued)

OTHER PUBLICATIONS

US Post Office Press Release titled, "Meow! Stamp Show Celebrates 'Year of the Cat'; Postal Service Issues Kitten Envelope"; PRNewswire; Philadelphia; Oct. 1, 1993. from Dialog by David J. Clark, Dec. 2, 2011.*

(Continued)

*Primary Examiner* — John Hayes
*Assistant Examiner* — David J Clark
(74) *Attorney, Agent, or Firm* — Hickman Palermo Truong & Becker LLP

(57) ABSTRACT

An envelope for conveying an item from a sender to a recipient and back with a window and unique identifying indicia. The envelope comprises a base panel with a window, a sender address panel, and a recipient address panel. The sender address panel is affixed to the base panel by an adhesive region, which defines a pocket sized to accept an item. The adhesive region extends laterally on the base panel to ensure that a postal cancellation is not applied to an area overlying the item. The recipient address panel is joined to the base panel by a detachable joint. A fragile item may be conveyed from the sender to the recipient and back without damage to the item. The base panel includes indicia that uniquely identify the envelope among a plurality of envelopes. Reading the indicia assists in resolving inventory problems, for example, when unknown items are returned.

16 Claims, 12 Drawing Sheets

FOREIGN PATENT DOCUMENTS

| | | |
|---|---|---|
| GB | 2179324 A | 3/1987 |
| WO | WO-9828198 A1 | 7/1998 |
| WO | WO-0010885 A1 | 3/2000 |

OTHER PUBLICATIONS

Snyder, Jeffrey Glenn, "Human-Compter Interface Specifications for People with Blindness," Colorado State University Department of Computer Science Technical Report CS-94-112, 1994, p. 47 of 62.

Anonymous, "Area File Listing for ShareWare Heaven 2 v104," downloaded Apr. 5, 2007, p. 91 of 101.

Anonymous, "Ed/iT The Complete Social Publisher Print Your Own Invitations," product data sheet downloaded Apr. 5, 2007, 2 pages.

Anonymous, "XpertSS.com XpertSS DBfields for Word Pro," downloaded Apr. 5, 2007, 2 pages.

* cited by examiner

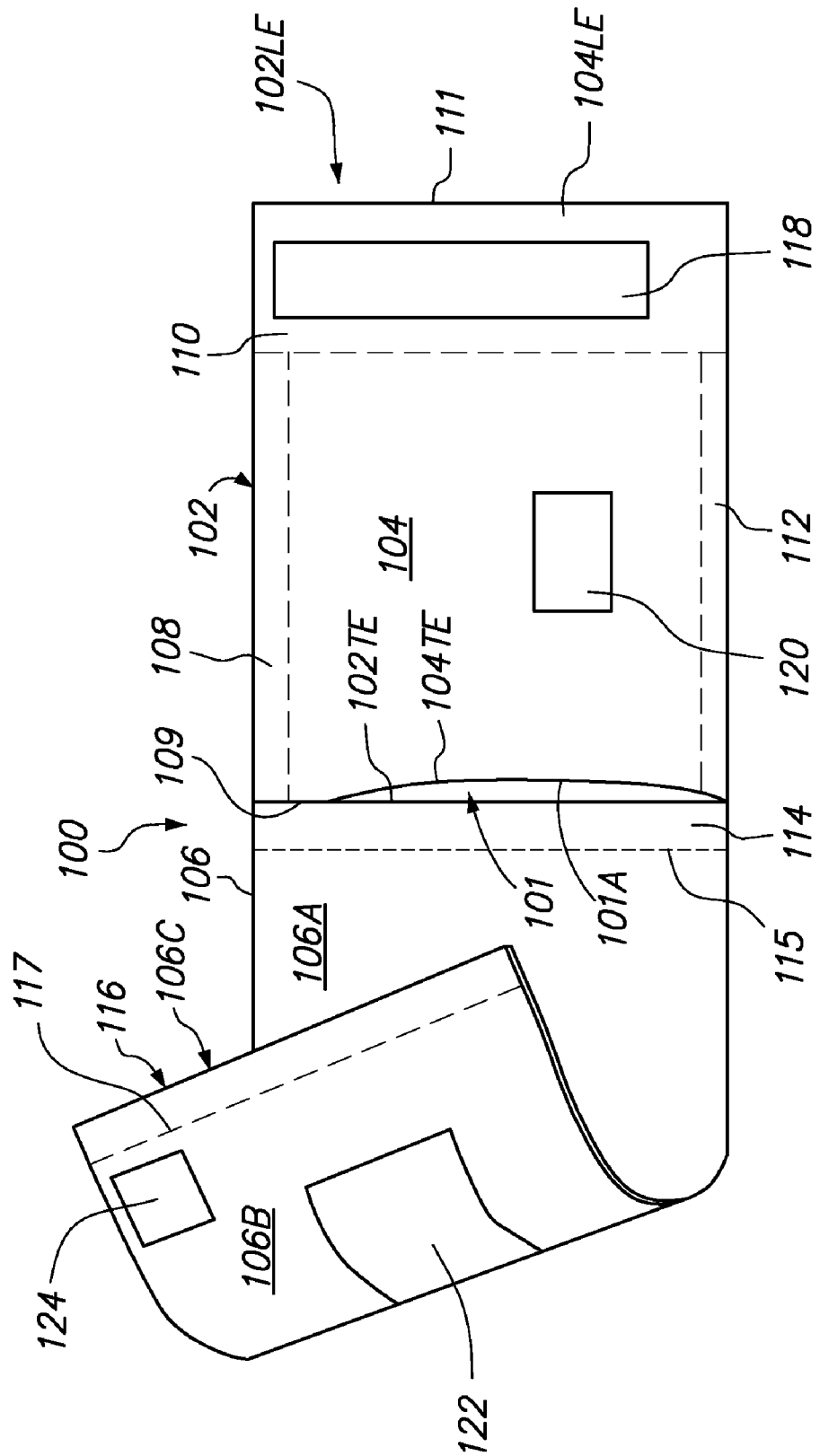

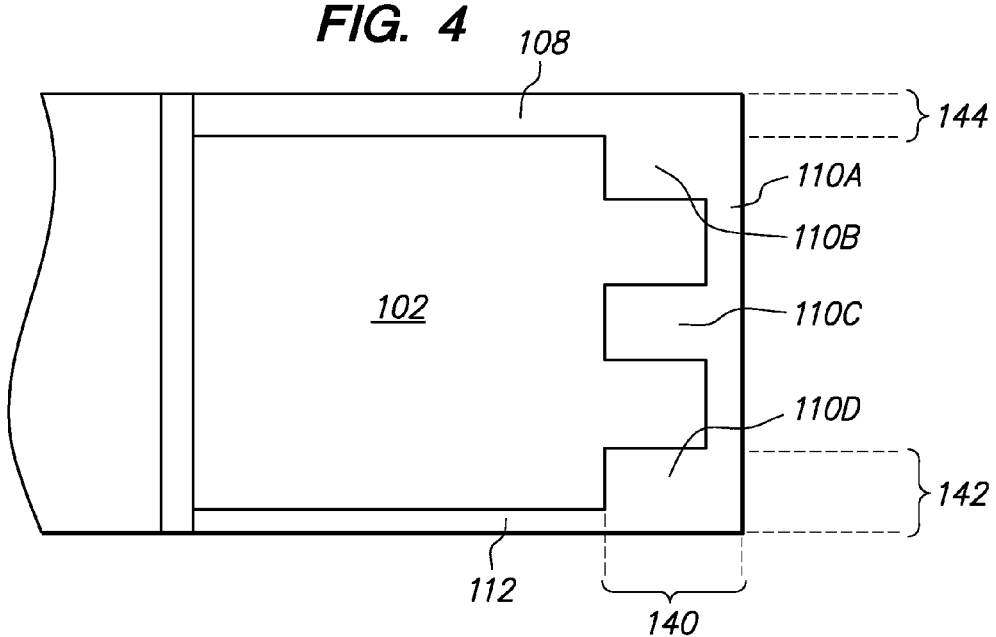
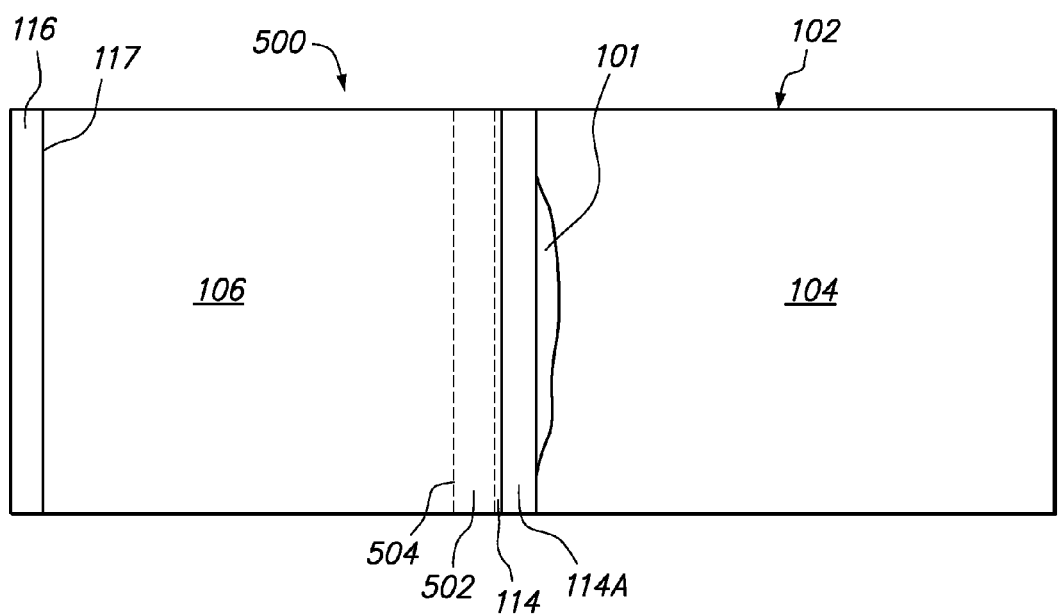

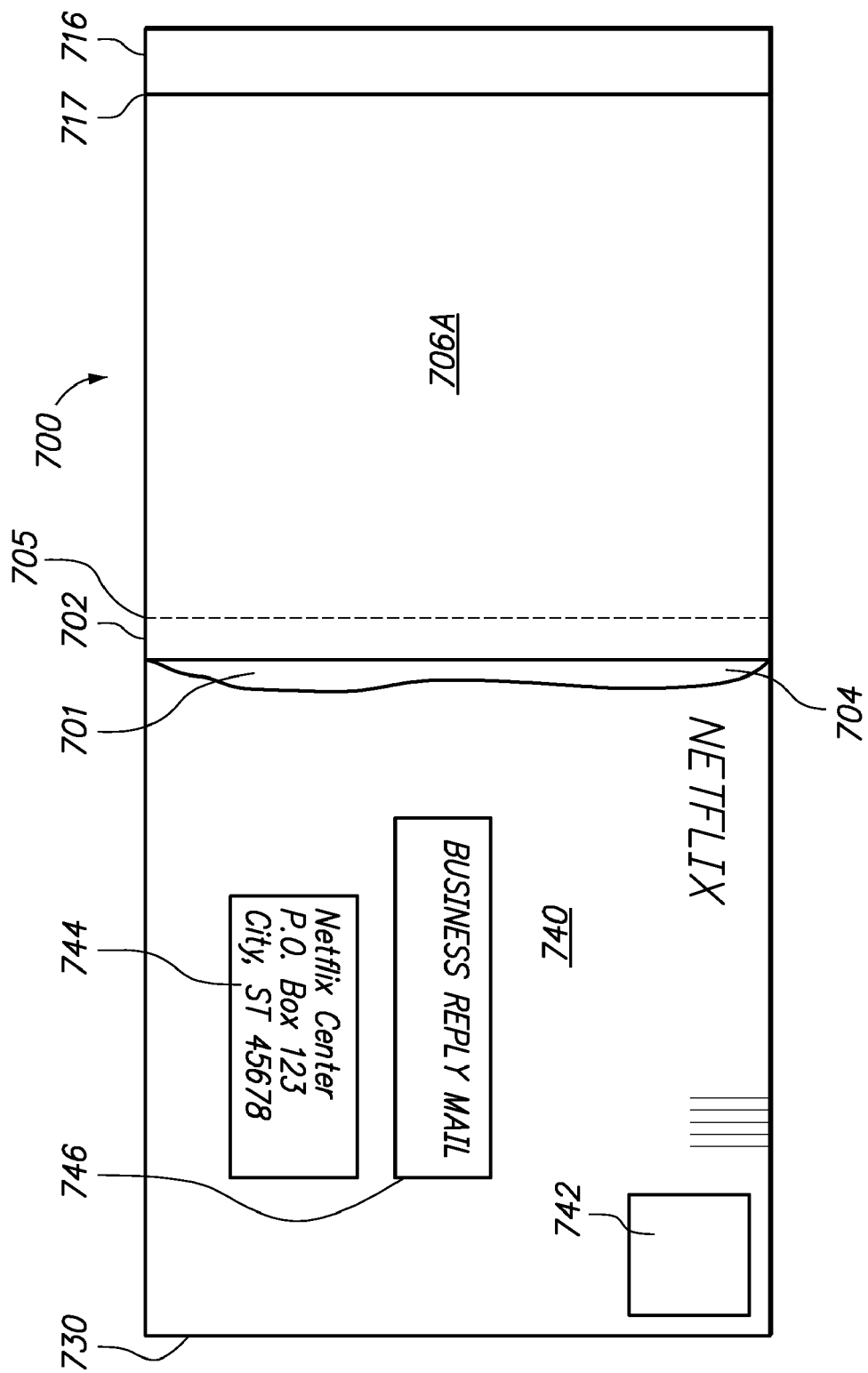

AUTOMATED MAILER ENVELOPE ADDRESSING

FIELD OF THE INVENTION

The present invention generally relates to mailers and envelopes. The invention relates more specifically to mailing and response envelopes structured to protect a fragile item therein during both sending and returning the item and with inventory control features.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Combination envelopes that can carry an item from a sender to a recipient, and back to the sender, are used in several business contexts. For example, in the context of invoicing and payment, multiple-folded envelopes have been used in which an invoice is affixed by a perforation to a reply envelope. The invoice is folded over and sealed to form a closed sending envelope, and an adhesive strip is provided adjacent to the reply envelope. When the customer receives such an envelope or "piece," the customer opens the piece, detaches the invoice, inserts a check for payment in the reply envelope, affixes the adhesive strip, and dispatches the sealed reply envelope in the mail. The use of this past approach, however, has been limited to paper enclosures such as invoices and the like.

The development of the Digital Versatile Disc ("DVD") as a medium for carrying digital movie and video information has led to new rental business models that use postal mail for media transport. For example, Netflix, Inc., of Los Gatos, Calif., offers a DVD rental service in which a subscriber establishes an online "pick list" of DVD movies that the subscriber wishes to rent. When a selected one of the DVD movies on the pick list becomes available in inventory, Netflix mails the selected DVD movie to the subscriber. The subscriber views the DVD and returns it to Netflix by mail. When the DVD is received at Netflix, the subscriber is entitled to receive another available DVD from the pick list.

In this context, however, problems can be encountered as the DVD passes through the postal delivery system. The packaging used to convey the DVD from Netflix to the customer passes through high-speed automatic sorting equipment at postal facilities. Further, the packaging used to convey the DVD from the customer to Netflix passes through high-speed automatic cancellation equipment at postal facilities, during which a postal cancellation mark is applied to the packaging. Because DVDs are manufactured from relatively brittle plastic material, and because the cancellation marks are applied with considerable force, a percentage of DVDs passing through the postal system in this manner are subject to damage, breakage or mutilation.

Based on the foregoing, there is a clear need for a way to package a fragile or breakable item for transport in the postal system from one party to another party in a manner that protects the item from damage, breakage or mutilation.

Another problem in this context relates to convenience. Customers of rental approaches, such as the DVD approach described above, demand convenience. When an item is sent to the customer, the customer expects to receive some form of postpaid return packaging with the item. Sending the return packaging separately is not practical or convenient. Accordingly, in this field there is a need for a packaging system in which a sending package and a return package are provided concurrently.

Still another issue involves the cost of the postage that is incurred in such a rental approach. The average weight of an item such as a DVD in a protective sleeve is approximately 0.58 ounces. Favorable postage rates are achieved when the total weight of the DVD, its protective sleeve, a sending package, and a return package are less than one ounce. Thus, there is a need for a packaging approach that solves all the foregoing problems and has an average weight less than one ounce.

Still another issue involves the cost of the packaging materials that are incurred. For a for-profit business engaged in the foregoing rental business, having packaging materials that satisfy all the foregoing requirements and have minimum cost is most desirable. Thus, there is a need for a packaging approach that solves all the preceding problems in a way that offers minimal cost.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a top plan view of a mailing and response envelope;

FIG. 4 is a top plan view of a bottom panel of the envelope of FIG. 1, illustrating an example adhesive configuration;

FIG. 5A and FIG. 5B depict an alternate embodiment of a mailing and response envelope;

FIG. 7B is a plan view of an inner side of the envelope of FIG. 7A;

DETAILED DESCRIPTION OF THE PREFERRED EMBODIMENT

Figure 2A:
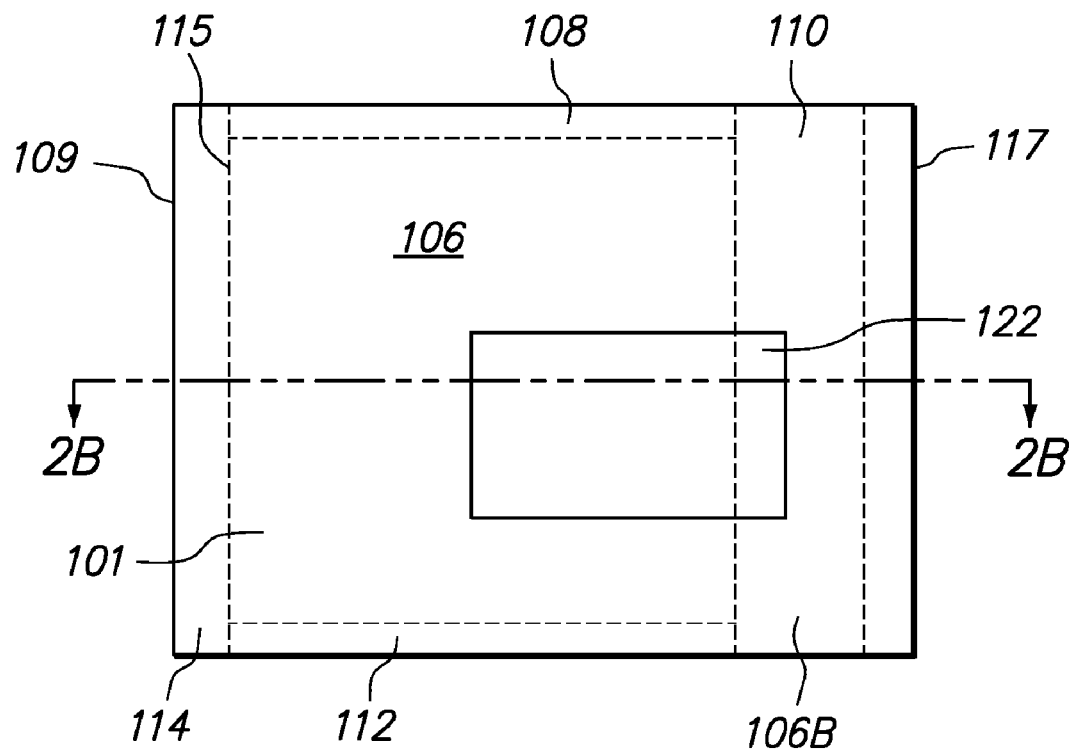
FIG. 2A is a top plan view of the envelope of FIG. 1 in a folded configuration for sending an item therein from a sender to an addressee.

A mailing and response envelope is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Mailing and Response Envelope
    2.1 Embodiments with Adhesive-Reinforced Leading Edge
    2.2 Embodiments with Perforated Access Strips
    2.3 Embodiments with Removable Labels
    2.4 Embodiment with Rear Window
3.0 Automated Addressing of Mailer Envelope and Method of Using Envelope in Inventory Control
4.0 Extensions and Alternatives 1.0 General Overview The needs identified in the foregoing Background, and other needs and objects that will become apparent for the following description, are achieved in the present invention, which comprises, in one aspect, an envelope for conveying an item from a sender to a recipient and back. The envelope comprises a base panel, a sender address panel, and a recipient address panel. The sender address panel is affixed to the base panel by an adhesive region. The sender address panel and adhesive region define a pocket sized to accept an item. The adhesive region extends laterally on the base panel in an amount selected to ensure that a postal cancellation is not applied to an area overlying the item. The recipient address panel is joined to the base panel by a detachable joint. In this configuration, a fragile item may be conveyed from a sender to a recipient and from the recipient back to the sender, without damage to the item.

Other aspects will become apparent from the following description.

2.0 Mailing and Response Envelope 2.1 Embodiments with Adhesive-Reinforced Leading Edge FIG. 1 is a top plan view of a mailing and response envelope 100 comprising a base panel 102, sender address panel 104, and recipient address panel 106. Base panel 102 and sender address panel 104 each comprise a leading edge 102LE, 104LE, respectively, and a trailing edge 102TE, 104TE, respectively. In this context, "leading edge" refers to an edge that first enters an automatic postal processing machine as envelope 100 is processed by the machine, and "trailing edge" refers to an edge that last enters the machine.

Sender address panel 104 is affixed to base panel 102 by one or more adhesive regions 108, 110, 112. A top adhesive region 108 affixes a top edge of sender address panel 104 to a corresponding top edge of base panel 102. A bottom adhesive region 112 affixes a bottom edge of the sender address panel to a corresponding bottom edge of the base panel. A leading adhesive region 110 affixes leading edge 102LE of the base panel 102 to the leading edge 104LE of the sender address panel 104. Collectively, the sender address panel 104, base panel 102, and adhesive regions 108, 110, 112 define a pocket 101 having an open end 101A that may receive an item.

In one embodiment, panels 102, 104, 106 are made of paper, which may bear printed indicia in any form. For example, 50-pound Offset Grade, acid-free paper from Boise Cascade may be used. Alternatively, panels 102, 104, 106 may comprise plastic materials such as polyethylene, cardstock, etc. Adhesive regions 108, 110, 112 may comprise clear open pot mailer glue, such as No. 33-9215 from National, applied to a face of panel 102.

Base panel 102 joins recipient address panel 106 at a fold 109 and perforation 115 that define a first longitudinal sealing adhesive region 114. Sealing adhesive region 114 may have any appropriate adhesive medium for sealing the region 114 onto sender address panel 104, thereby to close pocket 101 when an item is sent back from a recipient to a sender. For example, in one embodiment, "Kleenstick" peel-and-stick adhesive, comprising a non-sticky removable layer over a sticky self-adhesive material, is used. Each of the perforations and folds described herein may function, additionally or alternatively, as a detachable joint.

Recipient address panel 106 has an inside face 106A and outside face 106B. A distal end 106C of inside face 106A is provided with a longitudinal perforation line 117 that defines a second longitudinal sealing adhesive region 116, which may have any appropriate adhesive medium for sealing the region 116 onto base address panel 102, thereby to close the entire envelope 100 when an item is sent from a sender to a recipient. For example, in one embodiment, "Kleenstik" peel-and-stick adhesive is used.

Perforations 115, 117 may be formed using seven perforation teeth per inch (7 TPI), as an example.

Outside face 106B of recipient address panel 106 is the face of the envelope 100 that is exposed to postal authorities or other shipment personnel when the envelope is conveyed from a sender to a recipient. Accordingly, outside face 106B may be printed with indicia relating to the recipient and postage or other elements relating to properly transporting the envelope 100. In one embodiment, a recipient address region 122 bears a label, printing or other indicia that identifies a postal address of the recipient, and a postage region 124 bears postage, or identifies a postage permit number, or provides an indication that the sender has prepaid postage due for sending the envelope 100 to the recipient.

Sender address panel 104 is the face of the envelope 100 that is exposed to postal authorities or other shipment personnel when the envelope is conveyed from a recipient back to a sender. Accordingly, panel 104 may be printed with indicia relating to the sender and postage or other elements relating to properly transporting the envelope 100. In one embodiment, a sender address region 120 bears a label, printing or other indicia that identifies a postal address of the sender, and a postage region 118 bears postage, or identifies a postage permit number, or provides an indication that the sender has prepaid postage due for sending the envelope 100 back to itself. Postage region 118 may bear a facing identification mark (FIM), barcode, or other postal service indicia that is readable by automatic handling equipment.

In manufacturing, panels 102, 106 may be formed as a continuous sheet that is folded at fold 109 using suitable folding equipment, and panel 104 may be glued down on panel 106 using a multi-web continuous assembly machine. Alternatively, panels 102, 104, 106 may be formed as a contiguous sheet that is folded at edge 111 and fold 109 using suitable folding equipment. Dimensions of panels 102, 104, 106 are not critical and may vary in different embodiments. In one embodiment that qualifies for transport by the United States Postal Service as "letter" mail, rather than as a "flat," the height of panels 102, 104, 106 as measured in an up-anddown direction in FIG. 1 is no more than 6", and each panel has an overall width of about 8⅛".

Figure 2B:
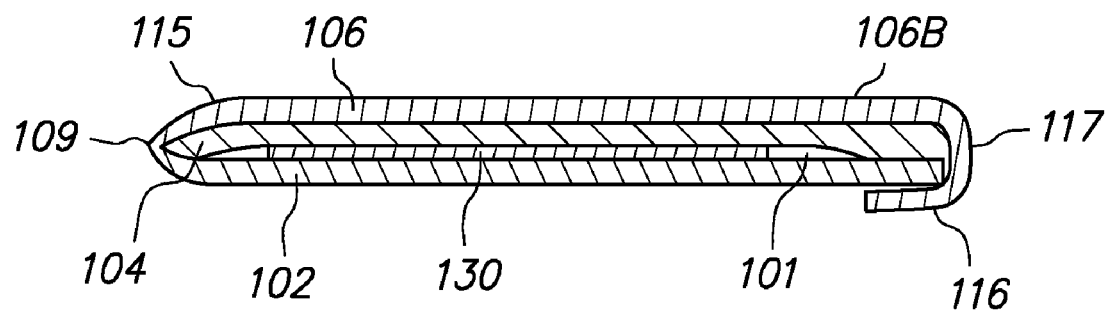
FIG. 2B is a section view of the envelope of FIG. 2A taken along line 2B-2B of FIG. 2A.

FIG. 2A is a top plan view of the envelope of FIG. 1 in a folded configuration for sending an item therein from a sender to an addressee. FIG. 2B is a section view of the envelope of FIG. 2A taken along line 2B-2B of FIG. 2A. In FIG. 2B, as well as in FIG. 3B, the thickness of panels is depicted in greatly exaggerated form, so that the relationship of panels in a folded configuration is clear.

In this configuration, an item 130 is carried in the pocket 101 defined by panels 102, 104. Panel 106 is folded at fold 109 over panel 104 such that outside face 106B is exposed to postal authorities or other methods of transport. Second adhesive region 116 is folded at perforation line 117 around and under panels 102, 104, such that the adhesive of the second adhesive region affixes panel 106 to panel 102. Optionally, in certain embodiments, additional adhesive may be applied on panel 104 before panel 106 is folded thereon, at approximately a lateral midline of panel 104, to provide additional adhesion to ensure that panel 106 lies fully flat over panel 104.

In folded and secured arrangement, the item may be conveyed from the sender to the recipient. Use of a relatively wide adhesive region 110 in this configuration has been found to substantially reduce breakage of a fragile item 130 within pocket 101. In particular, adhesive region 110 is typically aligned under an impact region associated with postal handling, processing, or cancellation equipment, but pocket 101 is aligned away from the impact region. As a result, any mechanical impact applied by the postal processing equipment strikes the adhesive region 110 and does not impact directly over the item in pocket 101. Further, by providing a relatively stiff laminated leading edge for envelope 100 that is less likely to jam in Postal Service mail processing equipment when the envelope is sent from sender to recipient.

Upon receipt, the recipient opens the envelope 100 by breaking perforation line 117. The recipient may then open panel 106 by moving it in a leftward direction with respect to FIG. 2A. The recipient may break perforation line 115 and discard panel 106. The recipient may remove the item 130 from pocket 101 by sliding it laterally outward in a leftward direction.

To return the item to the sender, the recipient re-inserts the item 130 into pocket 101. The recipient folds first adhesive region 114 on fold line 109 and seals the region to panel 104. The envelope 100 is then arranged as seen in FIG. 3A, FIG. 3B, and is ready for transport back to the sender.

Figure 3A:
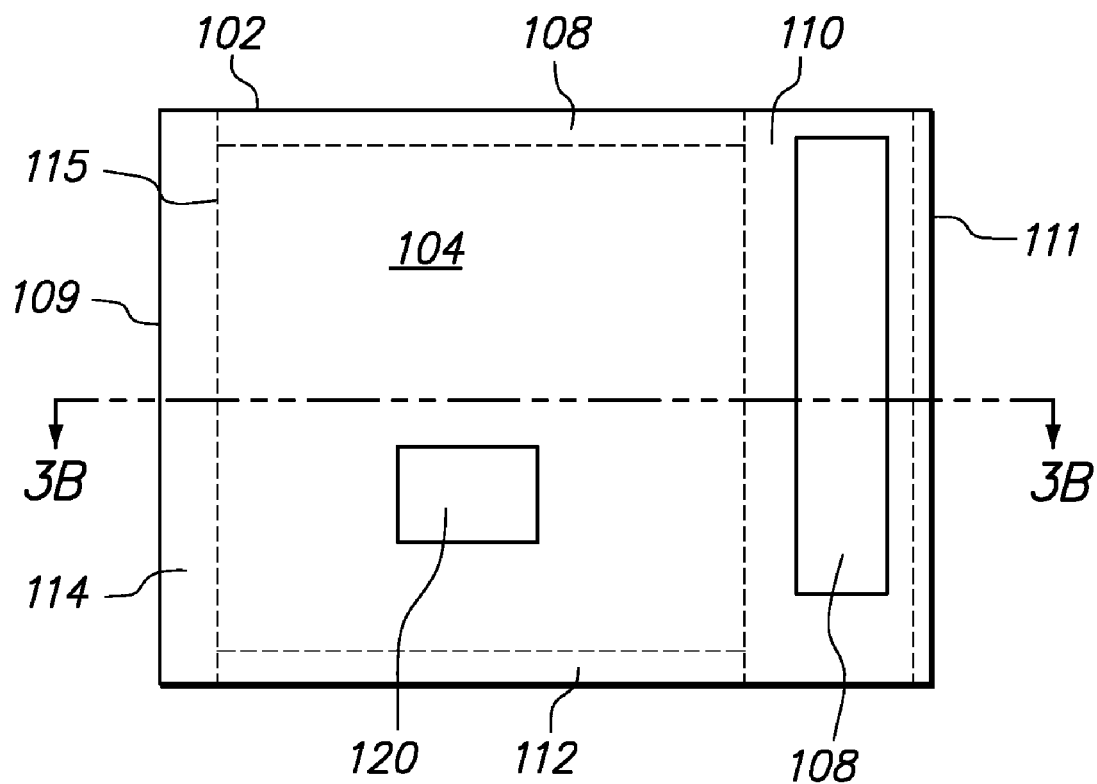
FIG. 3A is a top plan view of the envelope of FIG. 1 in a folded configuration for returning an item therein from an addressee to a sender.
Figure 3B:
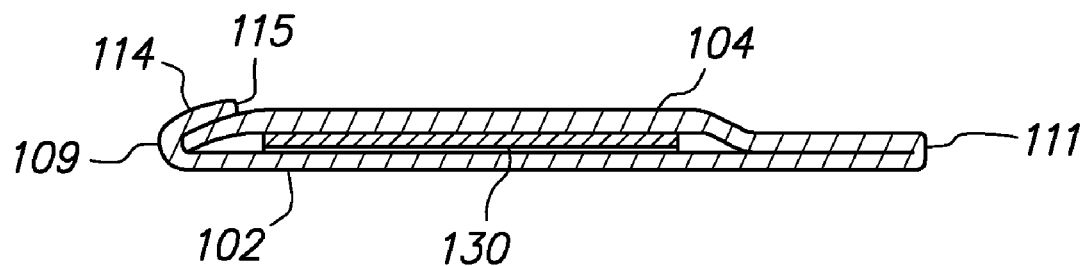
FIG. 3B is a section view of the envelope of FIG. 3A taken along line 3B-3B of FIG. 3A.

FIG. 3A is a top plan view of the envelope of FIG. 1 in a folded configuration for returning an item therein from an addressee to a sender. FIG. 3B is a section view of the envelope of FIG. 3A taken along line 3B-3B of FIG. 3A. In this arrangement, an item 130 is enclosed in pocket 101 as defined by panels 102, 104. First adhesive region 114 is folded at fold line 109 over panel 104 and its adhesive affixes to panel 104, so that panels 102, 104 form a closed envelope. Sender address indicia are visible to postal authorities or other transport equipment or personnel in sender address region 120. When a relatively wide adhesive region 110 is provided, an envelope 100 in this arrangement has been found to substantially reduce breakage of a fragile item 130 within pocket 101 by providing a relatively stiff laminated leading edge for the envelope.

FIG. 4 is a top plan view of a bottom panel of the envelope of FIG. 1, illustrating an example adhesive configuration.

In one example embodiment, the pocket 101 is sized to receive a generally planar media item such as a Digital Versatile Disk (DVD), Compact Disk (CD), CD-ROM, etc. In this embodiment, panels 102, 104 have overall length dimensions of approximately 8" and overall width dimensions of 6", adhesive regions 108, 112 have width dimensions of approximately ¼" to ⅜", and adhesive region 110 extends laterally inward from edge 111 by approximately 3".

The dimension of 3" has been found appropriate to ensure that postal processing equipment, some of which apply a cancellation stamp by using firm, mechanical pressure up to 3⅜" from the right edge of an envelope, does not impact a region directly over a disk media item carried in pocket 101. Thus, the adhesive region and panels 102, 104 cooperate to form a leading edge that clears an impact region associated with a postal processing machine. Similarly, the dimensions of the adhesive regions 108, 112 have been found appropriate to ensure that the postal cancellation does not directly impact the disk media item, by providing a top clearance 144 of about 1 3/16". In this arrangement, pocket 101 may have an approximate size of 5.125"×5.375", as an example.

As seen in FIG. 4, adhesive region 110 may be formed as a plurality of distinct adhesive sub-regions, for reducing the amount of adhesive required per envelope without detracting from the stiffness property provided by the presence of adhesive. In one embodiment, a generally elongated first adhesive sub-region 110A connects three other adhesive sub-regions 110B, 110C, 110D. The drawing of FIG. 4 is not to scale and the dimensions therein are approximate. In one embodiment, each adhesive sub-region 110B, 110C, 110D has a lateral width 140 of approximately 3" and a height 142 of approximately 1". The first adhesive sub-region 110A may be approximately ⅜" in width.

In alternative arrangements, more or fewer adhesive sub-regions in different configurations may be used. For example, the adhesive sub-regions need not be contiguous with corners of panel 102, as they are in FIG. 4. In one alternative embodiment, the adhesive sub-regions 110B, 110C, 110D may be disposed in a spaced-apart region along first adhesive sub-region 110A.

Adhesive regions 108, 110, 112 may be contiguous, as in FIG. 4. Adhesive sub-regions 110A, 110C, 110D may be formed contiguously with adhesive region 110. Alternatively, the adhesive regions or sub-regions are applied in a non-contiguous configuration.

The selection of the form and arrangement of adhesive regions may relate to an amount of postage that a business sender is willing to pay when sending envelopes 100 to recipients. For example, an envelope 100 in the configuration of FIG. 1-FIG. 4 is expected to have an approximate weight of 0.275 ounces; when an item is placed in the envelope, it is desirable in some embodiments for the item and envelope to weigh less than one ounce in total, so that extra postage does not apply. The amount of adhesive used for the adhesive regions can determine whether an envelope and item weigh more than one ounce.

Use of a relatively wide adhesive region 110 in this configuration has been found to substantially reduce breakage of a fragile item 130 within pocket 101. The region 110 provides a relatively stiff laminated leading edge for envelope 100 that is less likely to jam in postal processing equipment when the envelope is sent either from sender to recipient or from recipient to sender. While the exactly lateral width of adhesive region 110 is not critical, a width of approximately 3" has been found to yield superior results.

In other embodiments, the pocket 101 may accommodate other items and have other configurations.

In another alternative embodiment, recipient address indicia of recipient address region 122 is printed in an inverted orientation with respect to indicia in sender address region 122. Further, the position of postage region 124 is inverted both laterally and longitudinally so that it is properly oriented with respect to the new orientation of recipient address region 122. In this arrangement, when envelope 100 is transported in sealed form from sender to recipient, adhesive region 110 forms a trailing edge of the envelope. However, when envelope 100 is transported back from recipient to sender, adhesive region 110 forms a leading edge of the envelope.

This arrangement has been found useful in further reducing breakage of fragile media items that are carried from sender to recipient and back again. The arrangement is believed to provide good results because a different kind of postal inspection, processing and cancellation equipment is used to handle mail directed from a business sender to an individual recipient than for mail directed from an individual recipient back to the business.

2.2 Embodiments with Perforated Access Strips

Figure 5C:
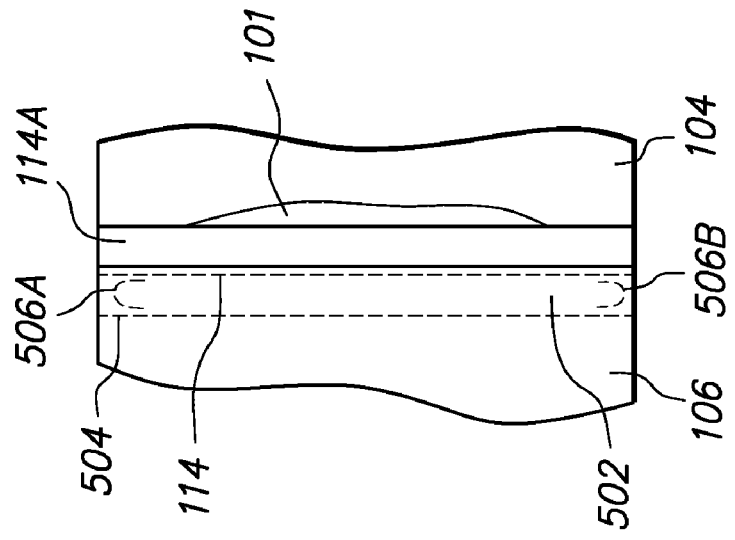
FIG. 5C is a top plan view of yet another alternative embodiment of a mailing and response envelope.
Figure 5B:
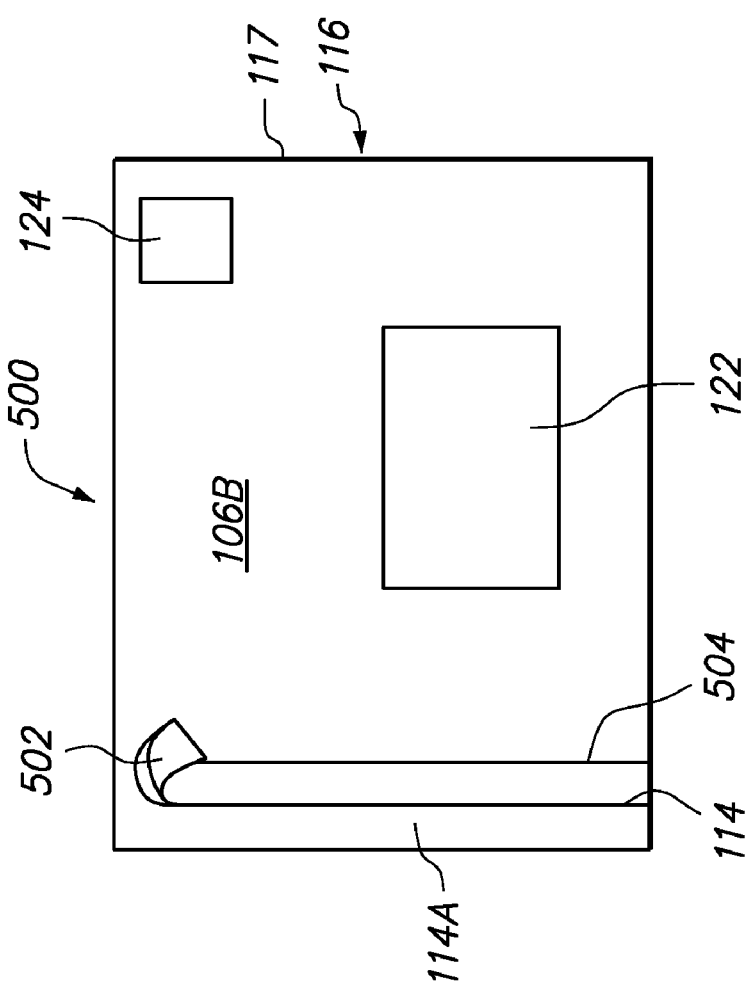

FIG. 5A and FIG. 5B depict an alternate embodiment of a mailing and response envelope 500. Referring first to FIG. 5A, panels 104, 106 are joined by a perforated strip 502 that is defined by a first perforation line 114 and a second perforation line 504. The envelope 500 is prepared for sending to a recipient by folding panel 106 onto panel 104 and affixing it thereto using the adhesive of adhesive region 116. Upon receipt, a recipient may open the envelope 500 by pulling upward or downward on a portion of strip 502, as shown in FIG. 5B until the strip is entirely removed. The recipient may then open panel 106 by moving it in a rightward direction with respect to FIG. 5B. Such action exposes panel 104 and pocket 101, from which the recipient may remove the item.

After using the item, the recipient may send the item back to the sender in the same manner as described above with respect to FIG. 1-FIG. 4.

FIG. 5C is a top plan view of yet another alternative embodiment of a mailing and response envelope 500. In this embodiment, strip 502 has one or more perforated tabs formed at the top and bottom of the strip, to facilitate a recipient grasping and pulling on the strip. For example, strip 502 comprises top and bottom curved or arcuate perforations 506A, 506B. A recipient may pull or pick at either of the perforations 506A, 506B until it separates from panel 106, and then grasp and pull the perforation so that all of strip 502 tears on perforations 114, 504.

2.3 Embodiments with Removable Labels

Figure 6A:
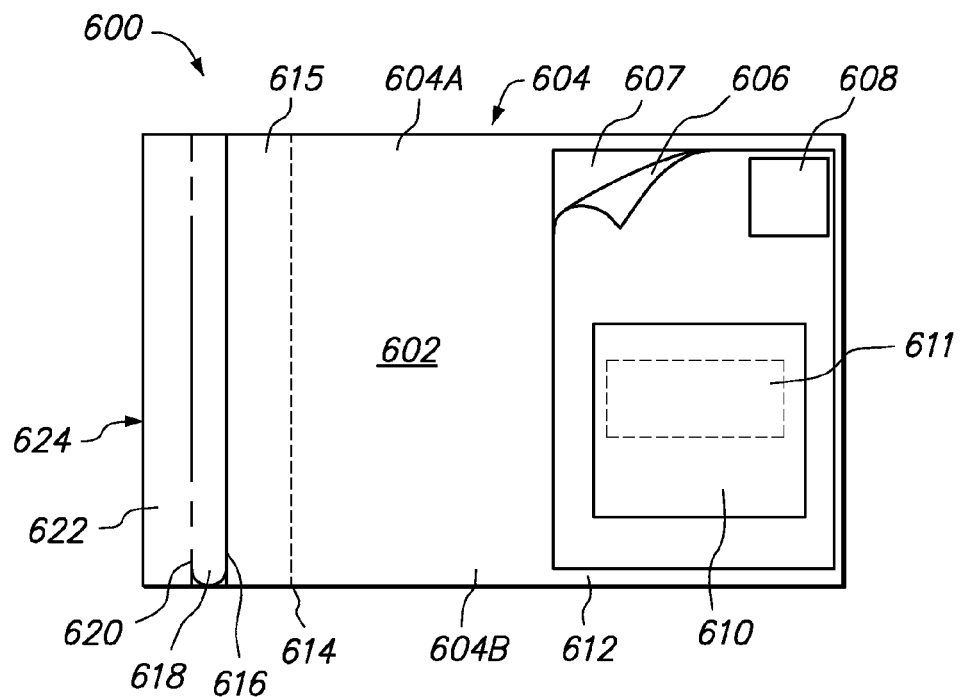
FIG. 6A is a top plan view of an envelope having a removable label feature.

FIG. 6A is a top plan view of an envelope having a removable label feature.

Envelope 600 comprises a top panel 602 and a bottom panel 604. A removable label 606 is carried on an underlying backing 607 that is affixed to top panel 602. The label 606 is printed with recipient address indicia in a recipient address region 610. A sending postage region 608 receives sending postage, a printed postage paid designation, or other indicia relating to conveying the envelope 600. A sender's address region 611 is provided on the backing 607 underlying the label 606 and is printed with a sender's address.

Panels 602, 604 are affixed to one another by adhesive strips along the upper edge 604A and lower edge 604B thereof, and by a planar region of adhesive 612 oriented below the label 606. In this configuration, panels 602, 604 form a pocket having a leading edge that is made relatively stiff by adhesive 612, and having an open end underlying perforation line 614. An item for transport from a sender to a recipient and back from the recipient to the sender may be carried in the pocket.

Envelope 600 further comprises a return sealing strip 615, removable access strip 618, and sending sealing strip 622, all of which may be formed integrally with top panel 602 and extend laterally outwardly from the top panel. Return sealing strip 615 is joined to top panel 602 by a first perforation line 614 and is further defined by a second perforation line 616. An underside of return sealing strip 615 is provided with return sealing adhesive (not shown), such as a peel-and-stick type of adhesive.

Removable access strip 618 is defined by second perforation line 616 and by a third perforation line 620 that adjoins the sending sealing strip 622. An underside 624 of sending sealing strip is provided with sending sealing adhesive (not shown), such as peel-and-stick adhesive.

Figure 6B:
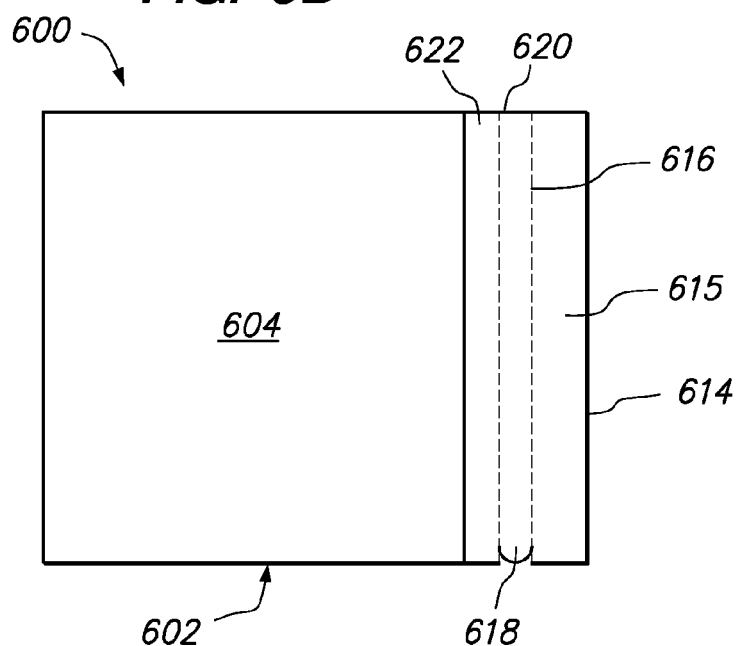
FIG. 6B is a bottom plan view of the envelope of FIG. 6A in a folded arrangement such that the envelope contains an item and is ready for sending from a sender to a recipient.

FIG. 6B is a bottom plan view of the envelope of FIG. 6A in a folded arrangement such that the envelope contains an item and is ready for sending from a sender to a recipient. The return sealing strip 615, removable access strip 618, and sending sealing strip 622 are folded as a unit at perforation line 114 into a position overlying bottom panel 604. The sending sealing adhesive is affixed to bottom panel 604. However, the return sealing adhesive underlying return sealing strip 615 is not affixed.

In this arrangement, envelope 600 may be sent from a sender to a recipient with an item in the pocket. Upon receipt, the recipient pulls removable access strip 618 upward, tearing it away from the envelope along perforations lines 616, 620. The recipient may then fold return sealing strip 615 away, thereby exposing the open end of the pocket, and may remove the item in the pocket by sliding it laterally outward, in a direction to the right in FIG. 6B.

To return the item to the sender, the recipient places the item back in the pocket by sliding it laterally inward. The return sealing adhesive is activated, for example, by peeling off its non-stick cover layer, and the return sealing strip 615 is then sealed to bottom panel 604. Referring again to FIG. 6A, the label 606 is then removed by peeling it away from the underlying backing 607 and discarding the label. Such action exposes the sender's address of region 611 on backing 607. In one embodiment, backing 607 also bears an indication that the envelope is postpaid for transport back to the sender, or postage. The recipient may then deposit the envelope into the postal system, or other system, for transport back to the sender.

2.4 Embodiment with Rear Window

Figure 7A:
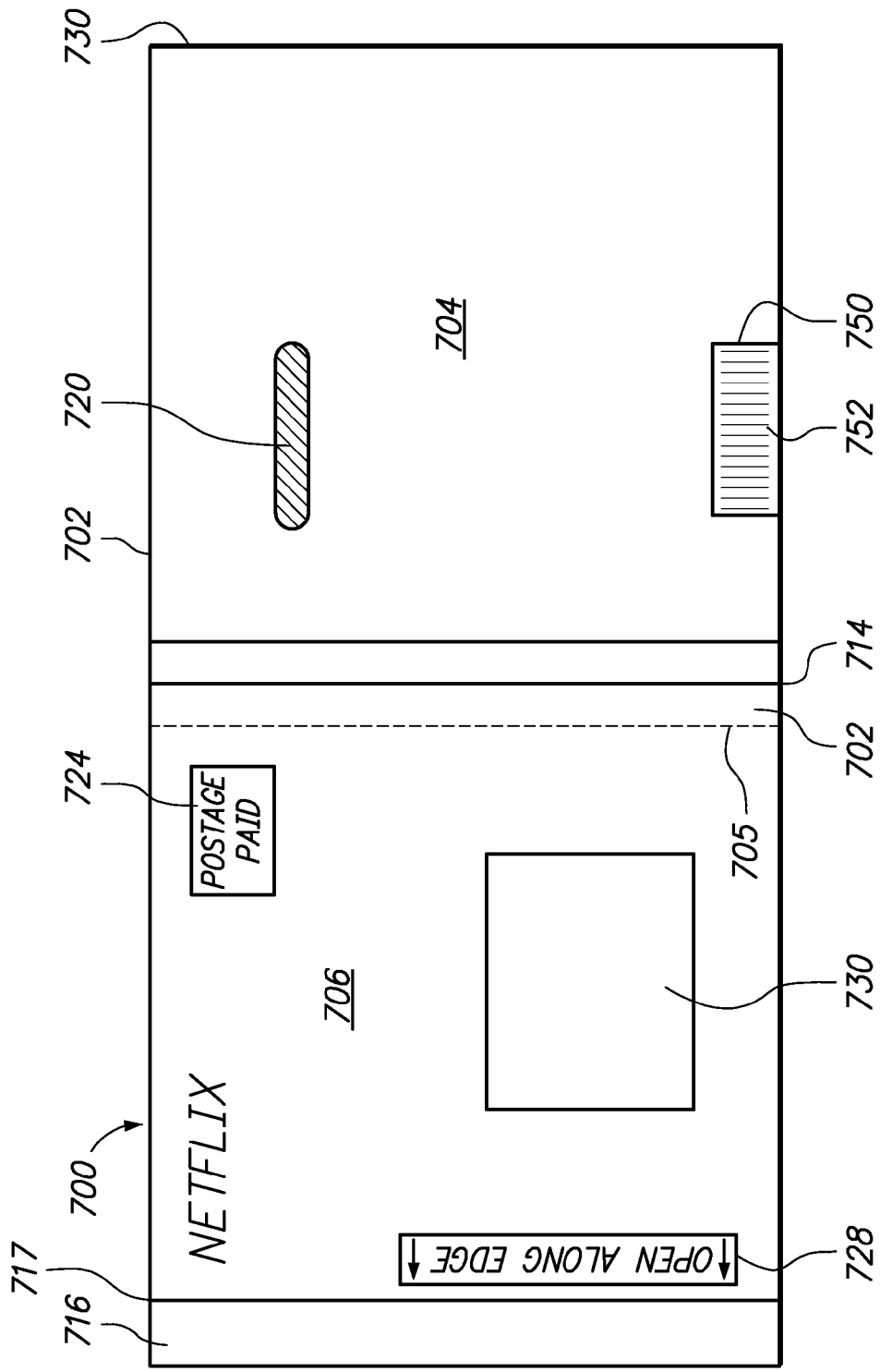
FIG. 7A is a plan view of an outer side of an alternate embodiment of a mailing and response envelope having a rear window.
Figure 7C:
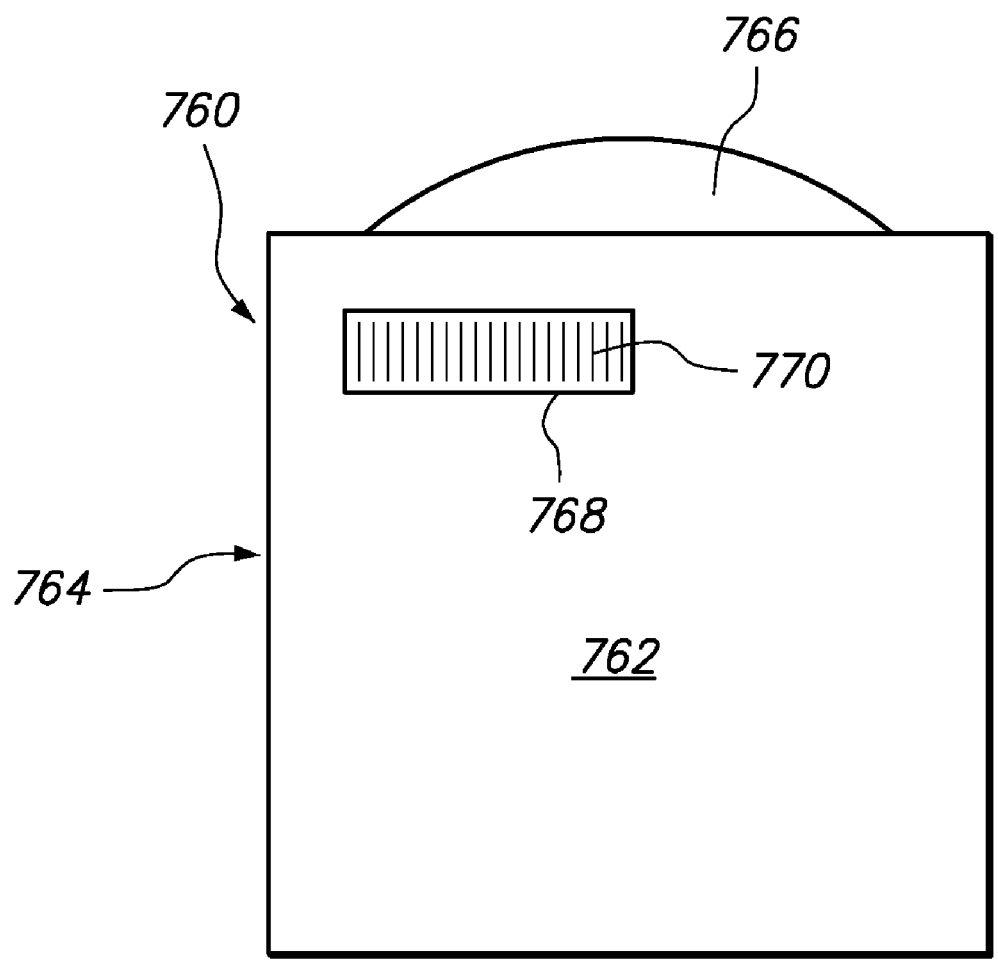
FIG. 7C is a plan view of a DVD sleeve bearing identifying indicia and useful with the envelope of FIG. 7A, FIG. 7B.

FIG. 7A is a plan view of an outer side of an alternate embodiment of a mailing and response envelope having a rear window. FIG. 7B is a plan view of the inner side of the envelope of FIG. 7A. FIG. 7C is a plan view of a DVD sleeve bearing identifying indicia and useful with the envelope of FIG. 7A, FIG. 7B.

Referring first to FIG. 7A, a mailing and response envelope 700 comprises a base panel 704 and a recipient address panel 706 that are joined by a perforated strip 702 that is defined by a first fold line 714 and a first perforation line 705. Panels 704, 706 and strip 702 may be formed integrally as a single sheet of and may be cut from a larger sheet or roll of paper that is used to make multiple panels and envelopes. The recipient address panel 706 further comprises a second perforation line 717 that defines a lateral strip 716, the underside of which carries an adhesive region.

As seen in FIG. 7B, base panel 704 is joined to a sender address panel 740 that is shown in cutaway view such that when joined, base panel 704 and sender address panel 740 define a pocket 701 that is closed on three edges and open in the center of the other side of the envelope. In this arrangement, the pocket can receive a relatively flat mailed item. In one embodiment, the item is a DVD contained within a protective inner sleeve.

As seen in FIG. 7C, a sleeve 760 may comprise a front panel 762 and a rear panel 764 that are sealed on three sides to form a sleeve that is open at a top edge and can receive a disc media item 766 or other flat item. In one embodiment, sleeve 760 comprises an identifying region 768 that bears a bar code 770 or other indicia that uniquely identifies the item 766. Bar code 770 is unique even when an inventory of items includes multiple copies of the same item having the same title. For example, in an embodiment in which items are DVD movies, an inventory may contain many copies of DVDs of the movie "Citizen Kane," but each sleeve for a copy of "Citizen Kane" bears a unique and different bar code 770. In an embodiment described further below, bar code 770 is used in an inventory control method that associates the bar code uniquely with the item 766 and a particular recipient of the item at a particular time.

As seen in FIG. 7A, base panel 704 further comprises a window 720. In one embodiment, window 720 comprises a die-cut hole in panel 704. Window 720 also may comprise a sheet of translucent protective material affixed over or under a hole. The window 720 may have any shape or size. The window 720 enables matter that is printed on the sleeve of an item within the pocket 701 that underlies panel 704 to show through panel 704. In one embodiment, window 720 is generally rectangular and has a lateral width sufficient to enable the bar code 770 or other identifying indicia of the sleeve 760 to show through panel 704 when the sleeve is in the pocket 701.

Additionally or alternatively, materials other than an item may be placed in pocket 701. For example, an item and a coupon, advertisement, message, or other printed material may be placed in pocket 701.

In one embodiment, recipient address panel 706 is printed with indicia indicating a sender of the envelope, a recipient or addressee of the envelope, and/or other information. In one embodiment, recipient address panel 706 is printed with postage-paid indicia 724 indicating that the sender holds a bulk-mailing permit or has otherwise paid postage associated with mailing the envelope. Alternatively, a sender may affix postage or a postage meter stamp in the same location as indicia 724. In an embodiment, recipient address panel 706 is printed with instructional information 728 to inform a recipient how to open the envelope without damaging the enclosed item. In an embodiment, recipient address panel 706 has a recipient address space 730 that is printed with a recipient address.

As seen in FIG. 7B, a reverse side 706A of panel 706 may be blank, or may be printed with instructions, advertising or promotional material, images, or any other desired matter. Panel 740 may be printed with return address information that is used when the recipient sends an item back to the sender. In an embodiment, panel 740 comprises a postage region 742 that may bear postage or may carry a printed indication that return of the envelope is postpaid. Panel 740 also may comprise a return address region 744 bearing a printed return address identifying the sender, and may comprise a Business Reply Mail indication 746. Alternatively, panel 740 may be blank and the recipient may apply postage and/or an appropriate return address.

After an item is placed in pocket 701 the envelope 700 is prepared for sending to a recipient by folding panel 706 along fold line 714 and inward onto panel 704. Adhesive underlying the lateral strip 716 is affixed to panel 704, thereby forming a closed envelope containing an item in the pocket. A bar code or other indicia on the sleeve is visible through window 720.

Upon receipt, a recipient may open the envelope 700 by breaking perforation line 717. When perforation line 717 is completely broken, lateral strip 716 remains affixed to panel 704 but panel 706 separates. The recipient may then open panel 706 by moving it in a rightward direction according to the orientation of FIG. 7B. Such action exposes the pocket 701, and the recipient may remove the item from the pocket by grasping the item in the pocket and sliding the item laterally, rightward in the orientation of FIG. 7B.

After using the item, the recipient may send the item back to the sender in the same manner as described above with respect to FIG. 1-FIG. 4. Base panel 704 further comprises a second adhesive region that underlies strip 702. To send the item back, the recipient breaks perforation line 705, discards panel 706, places the item back in the pocket, folds strip 702 along fold line 714, and affixes the second adhesive region of strip 702 onto an underside of panel 704, thereby sealing the item in the pocket and forming a return envelope.

In one embodiment, panel 704 further comprises an identifying indicia region 750 that bears an identifying indicia 752. In one embodiment, identifying indicia 752 comprises a bar code that encodes a numeric value that uniquely identifies a particular envelope 700 among thousands or millions of such envelopes that are used to send items to customers. As one example embodiment, identifying indicia 752 may be a bar code that uses code-128 symbology and encodes a base-34 number. The particular symbology used to encode values is not critical, and a symbology other than code-128 can be used. Valid digits in an example base-34 numbering scheme include numeric digits 0 through 9 and alphabetic characters A through Z, excluding the letter "I" and the letter "O". Each envelope 700 is printed with a different, unique base-34 number. Further, the bar code encodes a numeric value that comprises a bar code identifier, a printing plant identifier, and a serial number. For example, a valid value could be "J6A71JK0," in which J indicates bar code scheme J (meaning code-128), "6" means printing plant number 6, and "A71JK0" is a serial number for the envelope. When a 6-digit serial number and a single-digit plant identifier are used, the foregoing approach can be used to print over 52 billion envelopes with unique codes, and each of 34 plants can print over 1.5 billion envelopes with unique codes.

Figure 8:
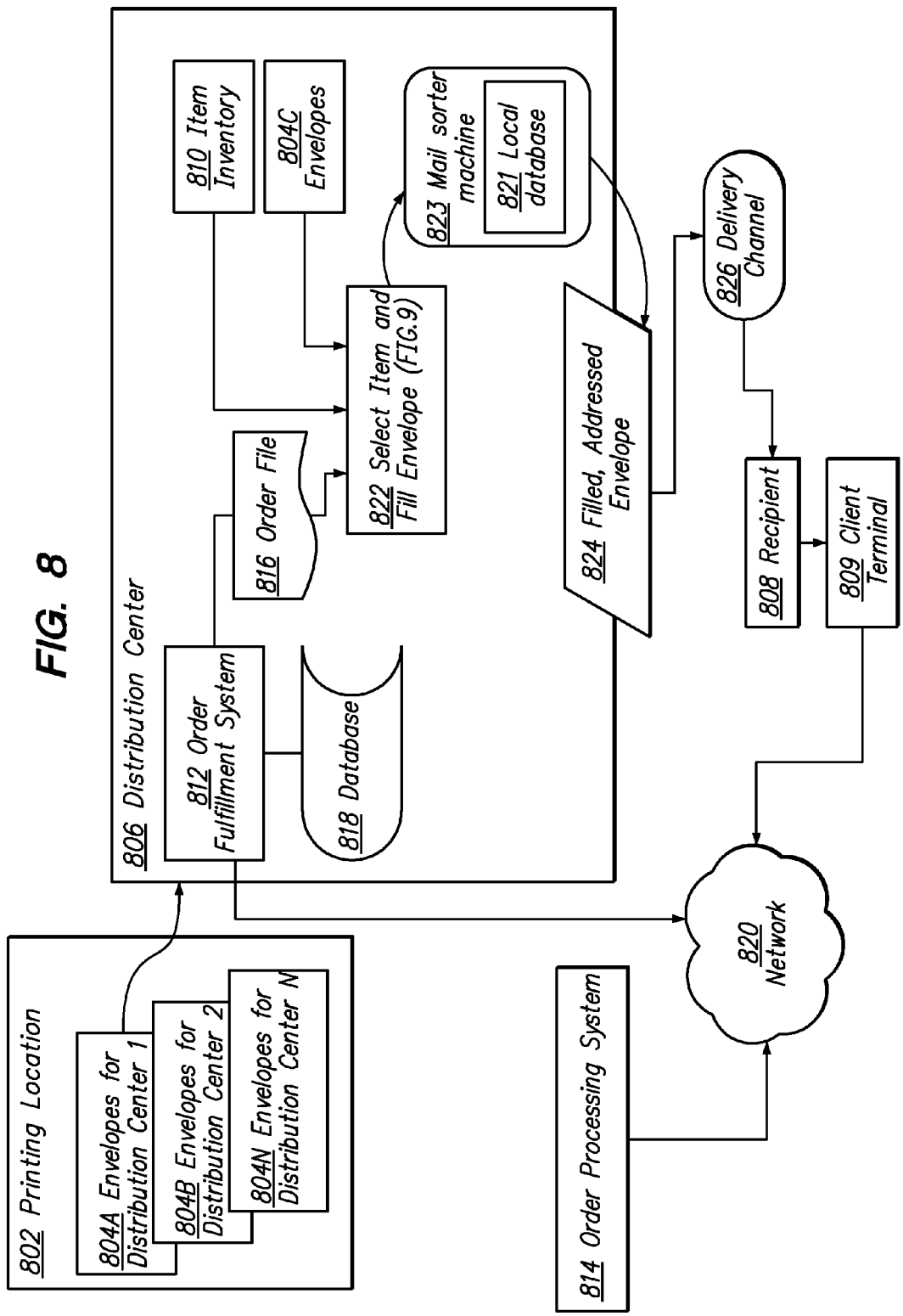
FIG. 8 is a block diagram of elements of an inventory control operation.
Figure 9A:
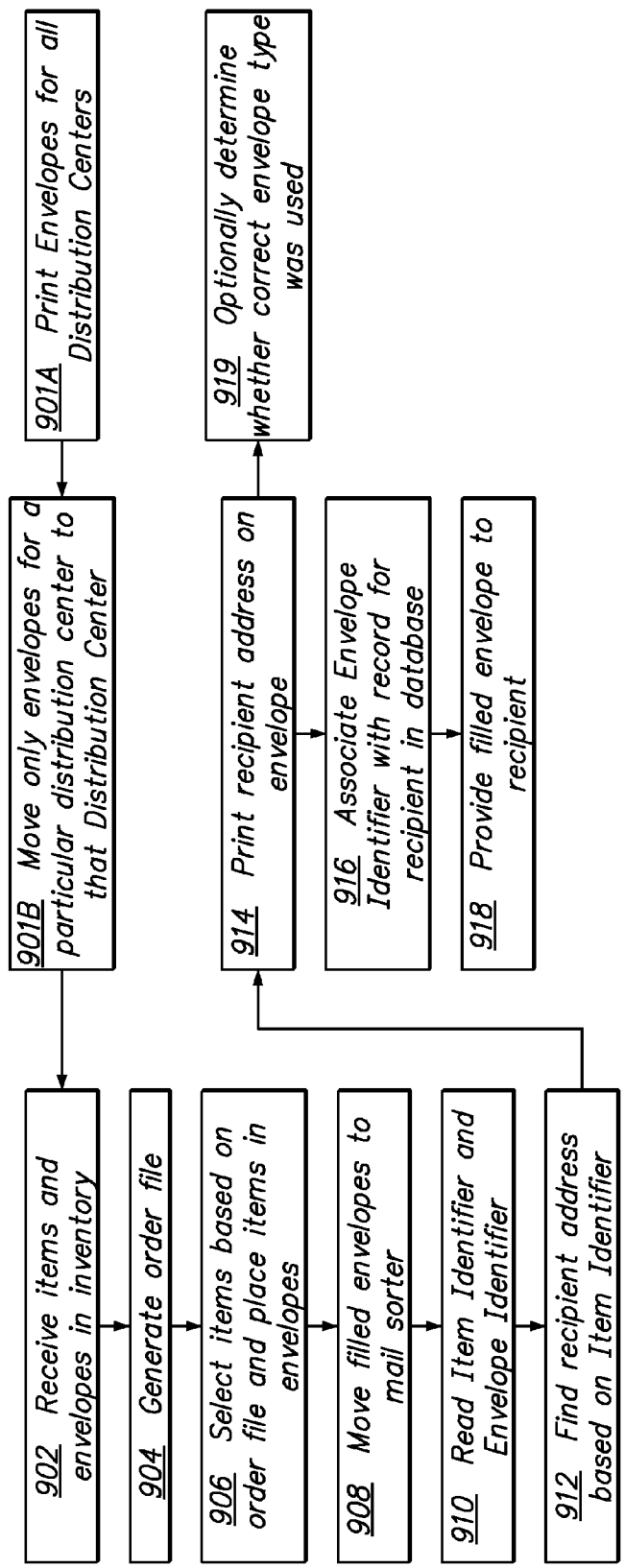
FIG. 9A is a flow diagram of a method of using the envelope of FIG. 7A, FIG. 7B in an inventory control operation and in sending envelopes with items to recipients.
Figure 9B:
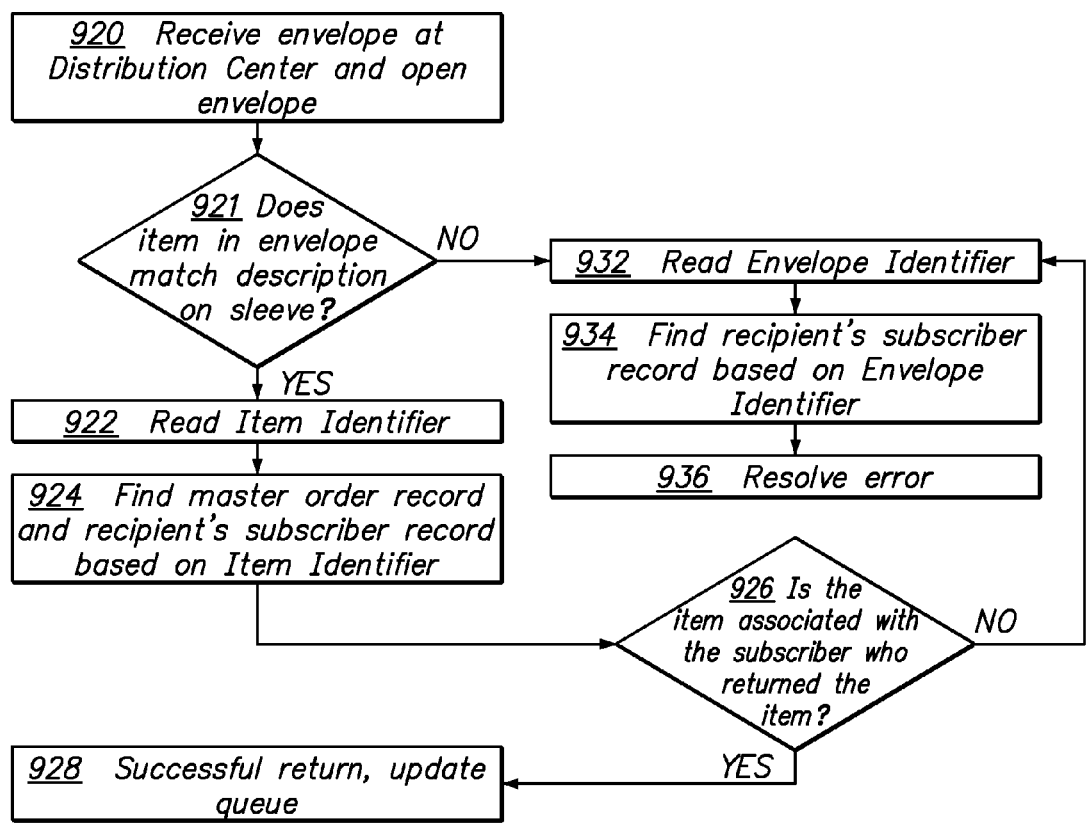
FIG. 9B is a flow diagram of a method of using the envelope of FIG. 7A, FIG. 7B in an inventory control operation and in receiving returned envelopes containing items from recipients.

3.0 Automated Addressing of Mailer Envelope and Method of Using Rear Window Envelope in Inventory Control The embodiment of FIG. 7A may be used in an inventory control operation that features use of the window. FIG. 8 is a block diagram of elements of an inventory control operation; FIG. 9A is a flow diagram of a method of using the envelope of FIG. 7A, FIG. 7B in an inventory control operation and in sending envelopes with items to recipients; FIG. 9B is a flow diagram of a method of using the envelope of FIG. 7A, FIG. 7B in an inventory control operation and in receiving returned envelopes containing items from recipients.

Referring first to FIG. 8, at a printing location 802 a plurality of sets of envelopes 804A, 804B, 804N are printed. Each set of envelopes bears a range of indicia that is associated with one of a plurality of item distribution centers. For example, assume that an item rental service owns or operates three distribution centers 1, 2, N that are geographically separated in various locations. Envelopes of the type shown in FIG. 7A, FIG. 7B are printed for the distribution centers and bear bar codes that uniquely identify the envelopes. A particular set of envelopes 804C is moved from the printing location 802 to a particular distribution center 806.

Further, envelopes 804A for distribution center 1 all have bar codes that encode numbers in a first range that is associated only with distribution center 1. Envelopes 804B for distribution center 2 have bar codes that encode numbers in a second range that is reserved for distribution center 2. Thus, the number encoded in a bar code for a particular envelope associates that envelope with one and only one distribution center.

In another embodiment, different groups of envelopes within a set of envelopes 804A may be printed with different specified material, such as advertisements or promotional material. The different groups may be associated with different ranges of numbers that are encoded in the bar codes. For example, bar codes encoding values in the range "J6A71JK0" to "J6A79000" might be printed with advertisements for a particular DVD that is set for release in the near future. Bar codes encoding a higher range of values might be associated with a later campaign. Advertisements or promotional material may be printed, for example, on panel 706A of envelope 700 as seen in FIG. 7B.

A distribution center 806 comprises an order fulfillment system 812 that is coupled to a database 818. Distribution center 806 further comprises an item inventory 810 and envelopes 804C that have been printed for that distribution center. A recipient 808 has a client terminal 809 that is communicatively coupled to a network 820. In one embodiment, client terminal 809 comprises the combination of a computing device, display device, input device, and browser software. For example, client terminal 809 comprises a personal computer with display and keyboard or pointing device, as well as a conventional Internet browser program such as Mozilla Firefox, Microsoft Internet Explorer, Netscape Navigator, etc.

Distribution center 806 further comprises a mail sorter machine 823 such as model "Omega" from National Presort, Inc. (NPI). Mail sorter machine 823 is fitted with two or more bar code readers, a print head, and software configured for communicating with order fulfillment system 812 to perform the functions that are described further herein. A stock NPI "Omega" mail sorter machine may be modified to provide optimized high-speed throughput for a large number of envelopes that contain relatively fragile items, such as DVDs, in an envelope and sleeve as shown in FIG. 7A, FIG. 7B, FIG. 7C. Example modifications include providing two or more bar code readers, and providing a thickness detector and a gate that cooperate to divert envelopes that contain excessively thick contents to a separate area for special processing. Mail sorter machine 823 also comprises a local database 821 that maps item identifiers to addresses of subscribers. Local database 821 may be loaded with subscriber address information from database 818 in a configuration step.

For purposes of illustrating a clear example, FIG. 8 shows only one distribution center 806. However, in an embodiment, there may be many distribution centers. Typically the distribution centers are geographically distributed so that a large number of subscribers can efficiently receive and return mailed items. Further, multiple distribution centers may be logically organized in groups such that each distribution center is associated with one or more satellite distribution centers. In this embodiment, a first distribution center may maintain a stock of envelopes that are preprinted with return addresses for a second, third, fourth, or other distribution center. Thus, a first distribution center may mail filled envelopes to subscribers that are preprinted with return addresses to another distribution center. In one approach, the return address is for another distribution center that is closer to the receiving subscriber than the distribution center that is mailing the envelope. In another approach, the return address is for another distribution center that needs to receive the item for subsequent shipment to another subscriber that has requested the same item; this approach is appropriate when inventory of a particular item is limited or an item is in high demand by many subscribers.

In still another approach, each distribution center always sends envelopes that are preprinted with a return address for that distribution center and the delivery channel is responsible for returning envelopes to another distribution center that is closer to a subscriber. For example, suppose a subscriber to an item rental service of Netflix lives near a distribution center in San Jose, Calif., but places in her queue an item for which only one copy is available and that copy is presently at a distribution center in Tulsa, Okla. The distribution center in Tulsa, Okla. provides the item to the delivery channel with a mailer envelope that is preprinted with a return address to that distribution center in Tulsa, Okla. but also bearing the master address designation "Nearest Netflix Distribution Center." Local offices of the delivery channel are given a list of all Netflix distribution centers and upon receiving the return mailer envelope in this example, the delivery channel reroutes the envelope to the distribution center in San Jose, Calif. The preceding scenario is termed cross-shipment. In an alternative scenario of the cross-shipment approach, the Tulsa, Okla. distribution center could provide the item to the delivery channel in an envelope that is preprinted with the San Jose, Calif. distribution center address.

An order processing system 814 is also coupled to the network 820. In one embodiment, order processing system 814 can display information about items that are available for rental and perform other functions associated with providing an item rental service. For example, order processing system 814 comprises one or more server computers, Web server software, application software, and database software that cooperate to deliver an online item rental service such as the online movie rental service offered by Netflix, Inc., Los Gatos, Calif.

Order fulfillment system 812 of the distribution center 806 is also coupled to the network 820. The order fulfillment system 812 receives, from order processing system 814 and through network 820, information about orders that the recipient 808 has entered. The order fulfillment system is not directly accessible to or by the recipient 808, but instead operates under control of an administrator at the distribution center 806 as a back-end element associated with order processing system 814.

Using this arrangement, the recipient 808 can order an item, which is placed into an envelope and printed on-demand with the recipient's address using the following general procedure. Recipient 808 uses client terminal 809 to connect through network 820 to order processing system 814. Using functions provided in electronic pages that the order processing system 814 generates and sends to client terminal 809, recipient 808 establishes an account with the item rental service associated with the order processing system, pays a fee associated with the service, and establishes an ordered list or queue of items that the recipient desires to rent. The queue is stored in a database or other storage associated with the order processing system 814. In one example embodiment, the recipient 808 pays a subscription fee that entitles the recipient to receive a specified number of rental movies per month, and establishes a list of 10 movie titles in priority order that is stored at the order processing system.

The order processing system 814 determines when an item in a list of a recipient 808 should be sent to the recipient, and which of several distribution centers 806 has a copy of the item. The order processing system 814 sends a master order record identifying the recipient and the item to the order fulfillment system 812 of that particular distribution center 806, and corresponding information is stored in database 818. Periodically the order fulfillment system generates an order file 816 that specifies all items that need to be sent for a particular time period. For example, once per day order fulfillment system 812 generates an order file of all items to send for a particular business day.

Based on the order file 816, as shown in block 822, items are selected from the item inventory 810 and placed in envelopes 804C. An address is applied to the filled envelope. The techniques described below in FIG. 9A may be used.

Each filled, addressed envelope 824 is placed in a delivery channel 826 for delivery to recipient 808. In an embodiment, filled, addressed envelopes are taken to a postal distribution center (PDC) of the US Postal Service and mailed to recipients. Thus, ultimately a letter carrier delivers an envelope 824 to recipient 808. However, other embodiments may use any other suitable form of a delivery channel, including personal delivery, courier delivery, delivery to a retail store location for pickup there by the recipient, etc.

The recipient 808 opens the envelope 824 and uses the item in the envelope. When use of the item is complete, the recipient 808 places the item back into that portion of the envelope that is structured for returning items to the distribution center, as described above in connection with FIG. 7A, FIG. 7B, and FIG. 7C.

Referring now to FIG. 9A, the foregoing general process is shown in further detail. At step 901A, envelopes for all distribution centers of an item rental service are printed, for example, at a contract printer. In step 901B, a set of envelopes only for a particular distribution center are moved to that distribution center. For example, step 901A may involve printing 1,000,000 envelopes and step 901B may involve moving 100,000 envelopes to distribution center 806 and another 100,000 envelopes to a different distribution center.

Steps 902-920 represent actions performed at one particular distribution center. In various embodiments, one or more of steps 902-920 may be performed using any combination of manual action, action by equipment, and action by computer software or databases.

In step 902, items and envelopes are received in inventory. Step 902 generally represents establishing an inventory of items and envelopes at the distribution center. In one embodiment, step 902 represents establishing an inventory of rental movies and two-way mailer envelopes of the type shown in FIG. 7A, 7B.

In step 904, an order file is generated. In one embodiment, periodically the order fulfillment system 812 generates an order file 816 that specifies titles or other identifying information for all rental movies that need to be sent for a particular time period. For example, once per day order fulfillment system 812 generates an order file of all movies to mail in a particular business day. The order file is converted into a language and structure that the mail sorter machine 823 can interpret and act upon.

In step 906, items are selected based on the order file and placed in envelopes. In one embodiment, a manual pick-and-stuff process is used to take rental DVD movies from an inventory area according to the order file and place the DVD movies in mailer envelopes. Step 906 also may involve selecting a particular group of envelopes for use on a particular day. For example, the inventory of envelopes may include multiple different groups of envelopes, each group associated with a different advertising or promotional campaign. Step 906 may involve obtaining one particular group of envelopes, or a batch of envelopes within a particular group. Further, step 906 involves placing rental items into mailer envelopes in an orientation that enables a bar code on the sleeve of the rental item to be visible through a window or hole in the mailer envelopes. As a result, a set of filled envelopes is created. Step 906 also may involve selecting an envelope bearing a return address for a different distribution center, to facilitate cross-shipment of items and inventory management.

In step 908, the filled envelopes are moved to an automated mail-sorting machine that comprises two or more bar code readers and automated printing apparatus. The filled envelopes are loaded into the mail-sorting machine, which is activated. Successive individual envelopes pass through the mail-sorting machine and are subjected to bar code reading and printing operations.

In step 910, an item identifier is read from the sleeve of the item through the window or hole in the envelope. In addition, an envelope identifier is read from the envelope. In one embodiment, the item identifier is a bar code on a sleeve of the item that uniquely identifies the item that is in the sleeve among all other items, and the envelope identifier is a bar code on the envelope that uniquely identifies one envelope among all other envelopes.

In step 912, an address for a recipient of a particular envelope is located based on the item identifier. For example, after reading the item identifier, the mail sorter machine 823 performs a query in database 821 to identify a column that contains a subscriber address based on the item identifier. In step 914, the recipient address is printed on the envelope. For example, upon receiving the response message, mail sorter machine 823 automatically formats and prints a delivery address of recipient 808 on a filled envelope 824. Printing may use sprayed printing using a print head contained in the mail sorter machine 823.

In step 916, the envelope identifier is associated in the database with a record for the recipient. For example, at step 916 immediately after sending the response message, order fulfillment system 812 updates a record in the database 821 to associate the envelope identifier with a particular subscriber, item identifier, and date. As a result, database 821 contains data that binds together information identifying a particular envelope, a particular item in the envelope, a particular recipient. Optionally, the database record and binding may include the date sent or other metadata. Thereafter, the contents of local database 821 may be uploaded to database 818 of order fulfillment system 812.

At step 918, the filled, addressed envelope is provided to a recipient. For example, envelope 924 is placed in delivery channel 826 for delivery.

Optionally, at step 919, at about the same time as steps 910, 912, 914, 916 are performed, a determination about whether the correct envelope type was used. For example, assume that groups of envelopes at a distribution center are associated with different time-sensitive marketing campaigns, and a particular group of envelopes is to be used only during a specified time period. After reading the envelope identifier at step 910, software associated with order fulfillment system 812 can compare the envelope identifier and the current date to a stored mapping of allowable dates and envelope identifier ranges, to determine whether the correct group of envelopes was used on a particular day. If not, then the software can create a log record, issue an alert message, create a database record, or take other responsive action.

The recipient 808 opens the envelope 824 and uses the item in the envelope. When use of the item is complete, the recipient 808 places the item back into that portion of the envelope that is structured for returning items to the distribution center. The recipient 808 then places the item into a delivery channel 826 for delivery to the distribution center.

Referring now to FIG. 9B, steps involved in processing returned items are shown. At some point in time after FIG. 9A, the envelope 824 is received at a distribution center and the envelope is opened at the distribution center, as shown in step 920. In step 921, a test is performed to determine if the item actually in the received envelope matches a description on a sleeve of the received item. For example, a manual visual check may be performed to determine whether the title or name of a received rental movie DVD matches a sleeve that contained the DVD in the envelope.

If a match occurs, then at step 922 the item identifier is read. For example, a bar code on the sleeve of the item is read using a bar code reader. At step 924, a master order record in the database and a subscriber's record are found based on the item identifier. Because the bar code on the sleeve is unique for all items in inventory, using the bar code of the sleeve as a key yields both an order record associated with sending that item to the recipient, and a subscriber record for the recipient. Further, because a distribution center within the system herein generated the item identifier on the item and necessarily mailed the item, the item identifier of a returned item always correlates to an item that is in the queue of some subscriber. Once the subscriber record associated with the item identifier is determined, that subscriber's queue is updated, as shown in step 928.

If the item in the envelope does not match the description on the sleeve (that is, step 921 is negative), or the envelope contains an item but no sleeve at all, or the returned item is not associated with the subscriber who returned the item (that is, step 926 is negative), then an erroneous return occurred, and the process of FIG. 9B provides steps for resolution. Such errors can occur, for example, when the recipient of an item returns personal property of the recipient, rather than a rental item owned by the rental service provider, in the envelope; when the recipient returns an item that was rented by a different subscriber (such as a friend) who uses the same rental service; when the recipient returns a first rental item in the sleeve for a second rental item; and other circumstances.

In step 932, the envelope identifier is read, and in step 934 a subscriber record for the person who returned the envelope is located based on the envelope identifier. Because of the binding in the database that was established at step 916 (FIG. 9A), the envelope identifier can be used to conclusively identify who returned the envelope.

Based on this information, the error can be resolved as indicated at step 936. Error resolution may include, in various embodiments: contacting the subscriber or recipient to inform that person that personal property was received; discarding the sleeve, creating a new sleeve that correctly matches the received item, and placing the new sleeve and received item in inventory; updating the queue of a different subscriber; and other responsive steps.

However, in all such cases, a benefit provided by the approach above is that the envelope identifier can be used to resolve a wide variety of erroneous return situations that previously would have been unable to resolve. For example, without the envelope identifier and database binding provided herein, the distribution center would be unable to determine how to process a received item that is not in inventory, lacks a correct sleeve, or is not associated with any recipient or subscriber—the received item would have to be discarded.

4.0 Extensions and Alternatives

In the foregoing specification, the invention has been described with reference to specific embodiments thereof. It will, however, be evident that various modifications and changes may be made thereto without departing from the broader spirit and scope of the invention. For example, while certain embodiments are described with reference to requirements of postal authorities, the U.S. Postal Service, or any other method or mechanism for conveying an item between a sender and recipient may be used. The specification and drawings are, accordingly, to be regarded in an illustrative rather than a restrictive sense.

What is claimed is:

1. A method, comprising:
    creating and storing a first inventory of items for delivery to one or more recipients and a second inventory of envelopes to contain the items, wherein each of the items has an item identifier that uniquely identifies that item among all the items in the first inventory, and wherein each of the envelopes has an envelope identifier that uniquely identifies that envelope among all the envelopes in the second inventory;
    selecting an item from the first inventory and placing the item in an envelope selected from the second inventory;
    reading, through a window in the envelope, the item identifier of the item in the envelope;
    locating, in a database based on the item identifier, a recipient address for a particular recipient;
    printing the recipient address on the envelope; and
    associating, in the database, the envelope identifier with the item identifier and information identifying the particular recipient;
    using a mail sorting machine, reading the envelope identifier on the envelope;
    locating a subscriber record associated with the envelope identifier in the database, wherein the subscriber record includes information identifying a recipient; and
    determining whether the envelope is among a set of envelopes that was expected to be used for the recipient identified in the subscriber record;
    receiving the envelope containing the item;
    when the item received in the envelope does not include the item identifier or does not match the item identifier associated with the item, reading the envelope identifier, locating information identifying a recipient in the database based on the envelope identifier, and using the information identifying the recipient to resolve how to handle the item.

2. The method of claim 1, further comprising providing the envelope to a delivery channel for delivery to the particular recipient.

3. The method of claim 1, wherein creating and storing the second inventory comprises receiving and storing a plurality of previously manufactured mailer envelopes, wherein each of the mailer envelopes comprises:
    a base panel having a leading edge, a trailing edge, and the window;
    a sender address panel affixed to the base panel by an adhesive region that extends laterally inward from the leading edge of the base panel;
    wherein the adhesive region, base panel and sender address panel collectively form a rigid leading edge, the adhesive region having a width dimension that aligns the adhesive region under all of an impact region of a processing machine and that aligns all of a pocket away from the impact region;
    wherein the base panel, sender address panel and a portion of the adhesive region define the pocket for the item;
    a recipient address panel joined to the trailing edge of the base panel by a detachable joint;
    wherein the window in the base panel is aligned to permit identifying indicia on the item to show through the window when the item is in the pocket.

4. The method of claim 3, further comprising placing in the pocket both the item and one or more printed materials.

5. The method of claim 1, wherein the item identifier is applied to a sleeve that contains the item.

6. The method of claim 1, further comprising updating the information identifying the recipient when the item received in the envelope includes the item identifier or matches the item identifier associated with the item.

7. The method of claim 1, wherein the items are digital versatile discs (DVDs).

8. The method of claim 1, wherein the items are any of compact discs (CDs), CD-ROMs, and game media items.

9. The method of claim 1, wherein the reading, locating, printing and associating steps are performed automatically in a mail sorter machine that is communicatively coupled to an item fulfillment system having a second database.

10. A method, comprising:
creating and storing a first inventory of audiovisual disc media items for delivery to one or more recipients and a second inventory of envelopes to contain the items, wherein each of the items has an item identifier that uniquely identifies that item among all the items in the first inventory, and wherein each of the envelopes has an envelope identifier that uniquely identifies that envelope among all the envelopes in the second inventory;
selecting an audiovisual disc media item from the first inventory and placing the item in an envelope selected from the second inventory;
reading, through a window in the envelope, the item identifier of the item in the envelope;
locating, in a database based on the item identifier, a recipient address for a particular recipient;
printing the recipient address on the envelope; and
associating, in the database, the envelope identifier with the item identifier and information identifying the particular recipient;
using a mail sorting machine, reading the envelope identifier on the envelope;
locating a subscriber record associated with the envelope identifier in the database, wherein the subscriber record includes information identifying a recipient; and
determining whether the envelope is among a set of envelopes that was expected to be used for the recipient identified in the subscriber record;
receiving the envelope containing the item;
when the item received in the envelope does not include the item identifier or does not match the item identifier associated with the item, reading the envelope identifier, locating information identifying a recipient in the database based on the envelope identifier, and using the information identifying the recipient to resolve how to handle the item.

11. The method of claim 10, further comprising providing the envelope to a delivery channel for delivery to the particular recipient.

12. The method of claim 10, wherein the item identifier is applied to a sleeve that contains the item.

13. The method of claim 10, further comprising updating the information identifying the recipient when the item received in the envelope includes the item identifier or matches the item identifier associated with the item.

14. The method of claim 10, wherein creating and storing the second inventory comprises receiving and storing a plurality of previously manufactured mailer envelopes, wherein each of the mailer envelopes comprises:
a base panel having a leading edge, a trailing edge, and the window;
a sender address panel affixed to the base panel by an adhesive region that extends laterally inward from the leading edge of the base panel;
wherein the adhesive region, base panel and sender address panel collectively form a rigid leading edge, the adhesive region having a width dimension that aligns the adhesive region under all of an impact region of a processing machine and that aligns all of a pocket away from the impact region;
wherein the base panel, sender address panel and a portion of the adhesive region define the pocket for the item;
a recipient address panel joined to the trailing edge of the base panel by a detachable joint;
wherein the window in the base panel is aligned to permit identifying indicia on the item to show through the window when the item is in the pocket.

15. The method of claim 14, further comprising placing in the pocket both a DVD and one or more printed materials.

16. The method of claim 10, wherein the steps are performed at a first distribution center, and further comprising selecting the envelope from among a third inventory of a plurality of envelopes that bear a return address to a second distribution center.

* * * * *